United States Patent
Horn et al.

(10) Patent No.: US 8,787,828 B2
(45) Date of Patent: Jul. 22, 2014

(54) IN-BAND PROVISIONING FOR A CLOSED SUBSCRIBER GROUP

(75) Inventors: Gavin B. Horn, La Jolla, CA (US); Osok Song, San Diego, CA (US); Gerardo Giaretta, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 12/642,309

(22) Filed: Dec. 18, 2009

(65) Prior Publication Data

US 2010/0159899 A1    Jun. 24, 2010

Related U.S. Application Data

(60) Provisional application No. 61/140,582, filed on Dec. 23, 2008.

(51) Int. Cl.
*H04W 4/00* (2009.01)
*H04W 36/00* (2009.01)
*H04B 1/06* (2006.01)
*G06F 15/16* (2006.01)

(52) U.S. Cl.
USPC ........ 455/26.1; 455/435.1; 455/444; 709/229

(58) Field of Classification Search
CPC ....... H04I 63/00; H04W 12/18; H04W 48/02; H04W 84/045
USPC .......... 455/436, 552.1, 443, 435.1, 26.1, 444; 715/764; 709/227, 206, 229
See application file for complete search history.

(56) References Cited

U.S. PATENT DOCUMENTS

| | | |
|---|---|---|
| 7,263,076 B1 | 8/2007 | Leibovitz et al. |
| 2004/0111520 A1* | 6/2004 | Krantz et al. ................. 709/229 |
| 2005/0198534 A1 | 9/2005 | Matta et al. |
| 2006/0190991 A1 | 8/2006 | Iyer |
| 2008/0192681 A1* | 8/2008 | Lee et al. ...................... 370/328 |
| 2008/0220782 A1 | 9/2008 | Wang et al. |
| 2008/0267153 A1 | 10/2008 | Mukherjee et al. |

(Continued)

FOREIGN PATENT DOCUMENTS

| | | |
|---|---|---|
| WO | WO2007128134 A1 | 11/2007 |
| WO | WO2009034076 A2 | 3/2009 |
| WO | WO2009048887 | 4/2009 |

OTHER PUBLICATIONS

3GPP TR 24.801 vs.i.o (Dec. 2008), 3rd Generation Partnership Project; Technical Specification Group Core Network and Terminals; 3GPP System Architecture Evolution; CT WG1 Aspects (Release 8) XP050365687.

(Continued)

*Primary Examiner* — Opiribo Georgewill
(74) *Attorney, Agent, or Firm* — François A. Pelaez

(57) ABSTRACT

In-band provisioning enables subscribers to manually provision themselves via an access point at which the subscribers would not otherwise be allowed access. For example, a subscriber may be temporarily accepted by a restricted access point (e.g., an access point that belongs to a closed subscriber group). The subscriber is then given limited access to enable the subscriber to be provisioned at the access point. For example, the subscriber may be provisioned for full access at the access point if the subscriber presents a valid authorization credential to a provisioning entity.

25 Claims, 13 Drawing Sheets

(56) References Cited

U.S. PATENT DOCUMENTS

| | | |
|---|---|---|
| 2009/0042576 A1* | 2/2009 | Mukherjee et al. ............ 455/436 |
| 2009/0070694 A1* | 3/2009 | Ore et al. ...................... 715/764 |
| 2009/0264095 A1 | 10/2009 | Khetawat et al. |
| 2009/0270092 A1 | 10/2009 | Buckley et al. |
| 2010/0157850 A1 | 6/2010 | Horn et al. |
| 2010/0240397 A1 | 9/2010 | Buchmayer et al. |
| 2011/0177814 A1 | 7/2011 | Buchmayer et al. |

OTHER PUBLICATIONS

Huawei: "A method of white l i st management" 3GPP Draft; CI-083297, 3rd Generation Partnership Project (3GPP), Mobile Competence Centre ; 650, Route Des Lucioles ; F-06921 Sophia-Antipolis Cedex ; France, no. Budapest, Hungary; Aug. 11, 2008, XP050308514 [retrieved on Aug. 11, 2008] chapter 10.12.4.x.

International Search Report and Written Opinion—PCT/US2009/69338 , International Search Authority—European Patent Office—Jul. 16, 2010.

NEC: "HNB Capability information indication to the HNB-GW" 3GPP Draft; R3-083022, SRD Generation Partnership Project (3GPP), Mobile Competence Centre ; 650, Route Des Lucioles ; F-06921 Sophia-Antipolis Cedex ; France, no. Prague, Czech Republic; Nov. 5, 2008, XP050324264.

Telecom Italia, "CR to 24.801: Network control on CSG access", 3GPP Draft; C1-072630, 20071016 3rd Generation Partnership Project (3GPP), Mobile Competence Centre ; 650, route des Lucioles ; F-06921 Sophia-Antipolis Cedex ; France, C1-072630, vol. CT WG1, Nr:Kobe, Japan; Oct. 16, 2007 XP050026730.

Vodafone et al: "Mobility Management Identifiers in EPS Entities" 3GPP TS6 CT WGI Meeting #48 Vienna vol. CI-071669, No. 48, Aug. 20, 2007, pp. 1-4, XP002516443.

Vodafone: "Support of Hybrid Mode CSG Cells in UTRAN" 3GPP Draft; R2_086462, SRD Generation Partnership Project (3GPP), Mobile Competence Centre ; 650, Route Des Lucioles ; F-06921 Sophia-Antipolis Cedex ; France, no. Prague, Czech Republic; Nov. 3, 2008, XP050321935.

Nokia Corporation, Nokia Siemens Networks : "HNB and HeNB Requirements", 3GPP TSG-RAN WG2 Meeting #61bis R2-081527,Apr. 4, 2008,P.1-P.5,URL, http://www.3gpp.org/ftp/tsg_ran/WG2_RL2/TSGR2_61bis/docs/R2-081527.zip.

Taiwan Search Report—TW098144570—TIPO—Nov. 20, 2012.

Qualcomm Europe,Support for self-provisioning at a CSG cell,3GPP TSG-SA1 #44 S1-090107,Feb. 2, 2009,p.1,URL,http://www.3gpp.org/ftp/tsg_sa/WG1_Serv/TSGS1_44_SanAntonio/tdocs/S1-090107.zip.

* cited by examiner

IN-BAND PROVISIONING FOR A CLOSED SUBSCRIBER GROUP

CLAIM OF PRIORITY

This application claims the benefit of and priority to commonly owned U.S. Provisional Patent Application No. 61/140,582, filed Dec. 23, 2008, and assigned, the disclosure of which is hereby incorporated by reference herein.

CROSS-REFERENCE TO RELATED APPLICATION

This application is related to concurrently filed and commonly owned U.S. patent application Ser. No. 12/642,330, entitled "IN-BAND PROVISIONING FOR A CLOSED SUBSCRIBER GROUP," the disclosure of which is hereby incorporated by reference herein.

BACKGROUND

1. Field

This application relates generally to wireless communication and more specifically, but not exclusively, to provisioning an access terminal to access a closed subscriber group.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network access points, small-coverage access points may be deployed (e.g., installed in a user's home) to provide more robust indoor wireless coverage to mobile access terminals. Such small-coverage access points may be referred to as femto access points, access point base stations, Home eNodeBs (HeNBs), Home NodeBs (HNBs), or home femtos. Typically, such small-coverage access points are connected to the Internet and the mobile operator's network via a DSL router or a cable modem.

In some scenarios, small-coverage access points may be deployed in an ad-hoc manner. Consequently, there may be issues associated with accessing these access points. For example, certain access terminals may need to be allowed to access some of these small-coverage access points, while other access terminals may need to be prevented from accessing these access points. Thus, there is a need for improved access management for wireless networks.

SUMMARY

A summary of sample aspects of the disclosure follows. In the discussion herein, any reference to the term aspects may refer to one or more aspects of the disclosure.

The disclosure relates in some aspects to in-band provisioning of a subscriber at an access point with restricted access. For example, a conventional access point that belongs to a closed subscriber group (CSG) may restrict access to only those subscribers who are provisioned to access the CSG. In accordance with the teachings herein, in-band provisioning may be employed to allow subscribers to manually provision themselves via a CSG at which the subscribers would not otherwise be allowed access. For example, a subscriber may be temporarily accepted by the restricted access point and given limited access to enable the subscriber to be provisioned at the CSG. In this way, a wireless network operator may selectively allow subscribers to be provisioned at certain CSGs (e.g., upon payment of a one-time access fee) and access one or more services via these CSGs. As a specific example, an operator may allow in-band provisioning for hotel, airport or coffee shop CSGs, but not residential CSGs.

BRIEF DESCRIPTION OF THE DRAWINGS

These and other sample aspects of the disclosure will be described in the detailed description and the appended claims that follow, and in the accompanying drawings, wherein:

Figure 1:
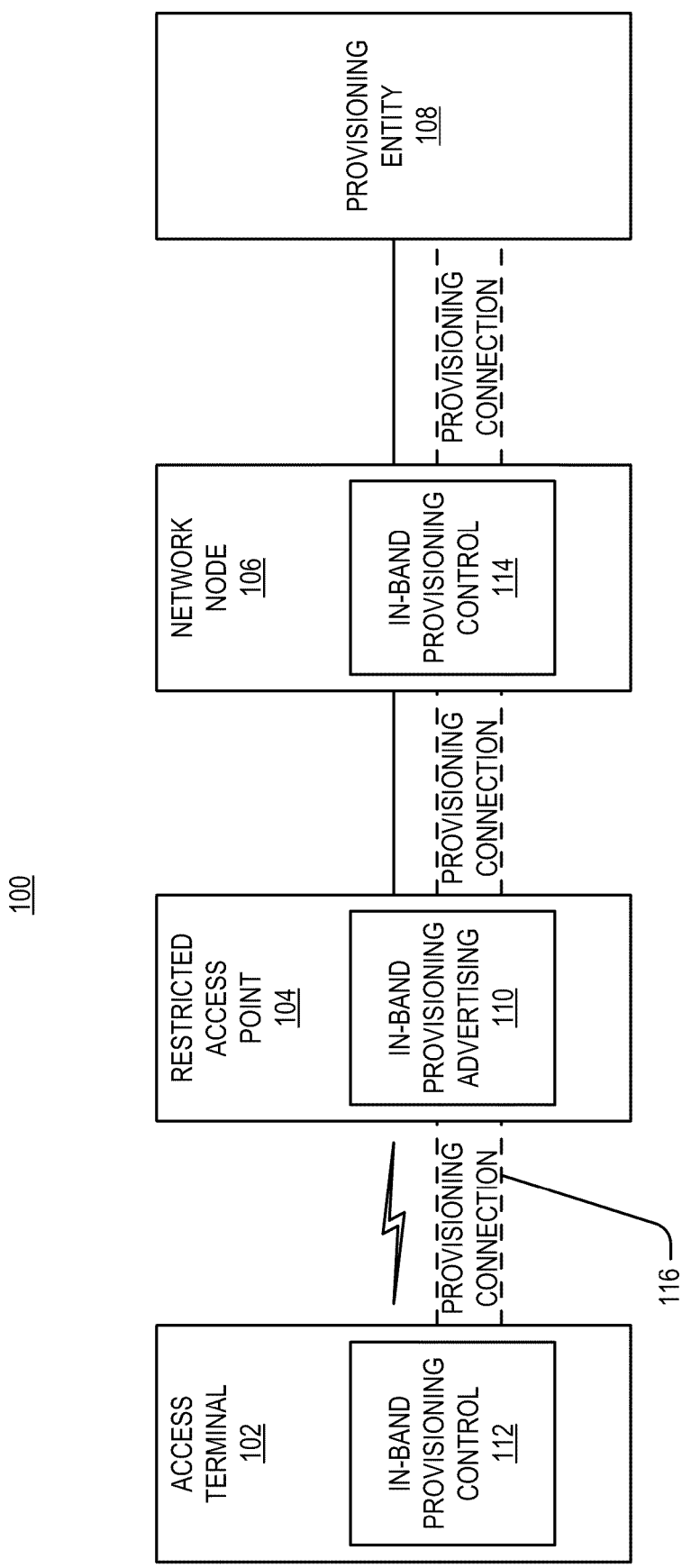
FIG. 1 is a simplified block diagram of several sample aspects of a communication system adapted to provide in-band provisioning.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, NodeBs, or eNodeBs, while access terminals may be referred to or implemented as user equipment or mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some other access point (not shown) in the system 100. Each of the access points may communicate with one or more network nodes (represented, for convenience, by network node 106) to facilitate wide area network connectivity. These network nodes may take various forms such as, for example, one or more radio and/or core network entities. Thus, in various implementations the network node 106 may represent functionality such as at least one of: network management (e.g., via an operation, administration, management, and provisioning entity), call control, session management, mobility management, gateway functions, interworking functions, or some other suitable network functionality.

The illustrated nodes of the system 100 are configured to provide in-band provisioning (also referred to as user self-provisioning) to enable an access terminal to access an otherwise restricted access point. In some aspects, the term in-band provisioning refers to provisioning an access terminal to access an access point when the access terminal is communication with the access point. Thus, in-band provisioning may be distinguished from out-of-band provisioning where the access terminal is provisioned when the access terminal is not in communication with the access point.

In some cases, a subscriber may wish to be provisioned at a restricted access point associated with a wireless cell set. In general, a wireless cell set comprises a set of one or more cells (e.g., at least one access point) where there is a defined relationship specific to that set. An example of a wireless cell set is a CSG. For convenience, the discussion that follows may simply refer to the term CSG, rather than the more general term wireless cell set. It should be appreciated, however, that the described concepts may be applicable to other types of defined sets or groups of wireless cells or other similar entities.

As described in more detail below, the access point 104 may include an in-band provisioning advertising component 110 that advertises (e.g., broadcasts) an indication that the access point 104 supports in-band provisioning. Upon receiving this indication or upon determining in some other way that the access point 104 supports in-band provisioning, an access terminal that is not otherwise allowed to access the access point (e.g., the access terminal 102) may send a request to connect to the access point 104. Here, the access terminal 102 includes an in-band provisioning control component 112 for performing in-band provisioning-related operations. The access point 110 informs the network of this connection request, whereupon the network node 106 (e.g., an in-band provisioning control component 114) may establish a provisioning connection to enable the access terminal 102 to be provisioned for access at the access point 104.

The provisioning connection provides limited access for the access terminal 102. Specifically, a provisioning connection comprises limited Internet Protocol connectivity that may only be used to access a provisioning entity. In some aspects, a provisioning connection may establish connectivity to an Internet Protocol network that allows an access terminal to be provisioned to access a closed subscriber group. For example, a packet data network (PDN) connection may be established to a node that filters packets and only allows packets relating to provisioning to be passed and/or redirects the packets to a provisioning entity. As an example of redirection, the node may redirect all HTTP Get requests to a particular web page (e.g., one that allows the access terminal to provision itself), irrespective of the web page requested by the Get request.

The provisioning connection is represented in FIG. 1 by the pair of dashed lines 116 between the access terminal 102 and the provisioning entity 108. Here, a provisioning connection may enable the access terminal 102 to send and receive control signals. In addition, the provisioning connection may enable the access terminal 102 to send data to and receive data from the provisioning entity 108 (e.g., a CSG administration function or a web server), but no other endpoints.

Once the provisioning connection is established, the access terminal 102 may be prompted to send authorization information (e.g., a password, payment information, etc.) to the provisioning entity 108. Upon verification of the authorization information, the provisioning entity 108 may provision the access terminal 102 to access the access point 104. For example, subscription information for the access terminal 102 may be modified to indicate that the access terminal is a member of a CSG associated with the access point 104. Consequently, the access terminal 102 may then be allowed greater access (e.g., full access) at the access point 104.

Figure 3:
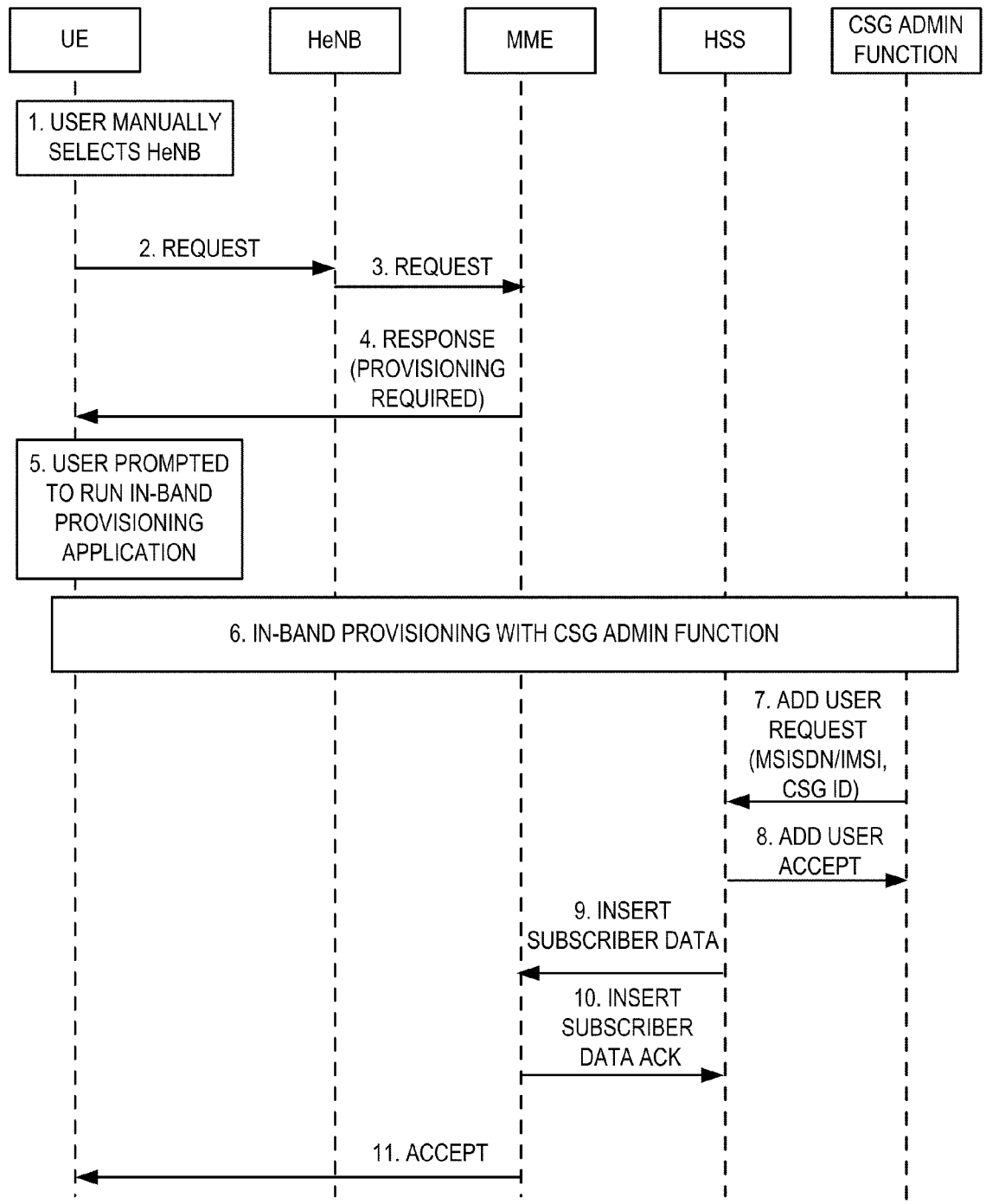
FIG. 3 is a simplified call flow illustrating several sample aspects of operations that may be performed to provide in-band provisioning.
Figure 4:
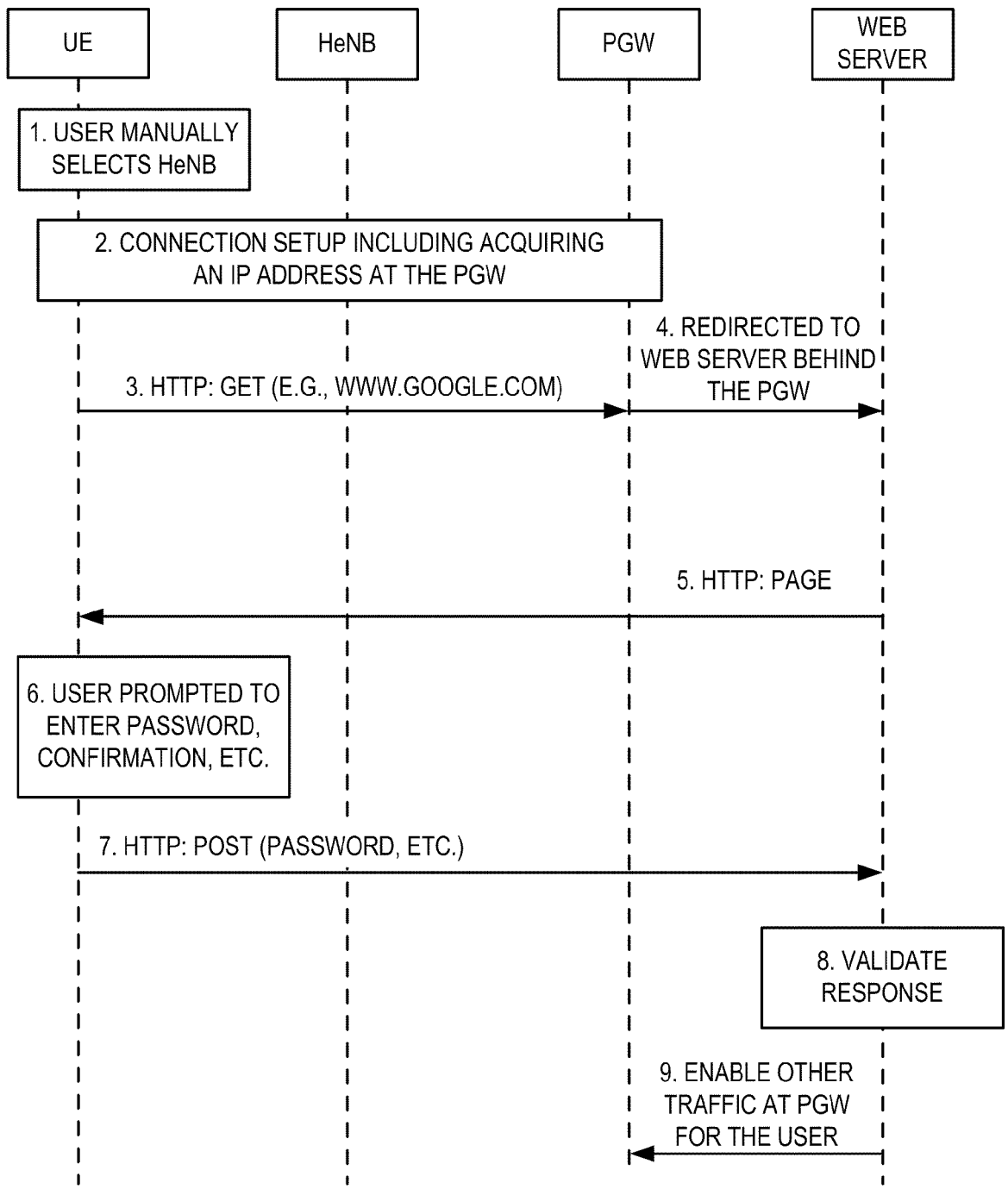
FIG. 4 is a simplified call flow illustrating several sample aspects of operations that may be performed to provide in-band provisioning.

With the above in mind, sample operations and components that may be employed to provide in-band provisioning at a restricted access point in accordance with the teachings herein will be described with reference to FIGS. 2A-4. Briefly, FIGS. 2A-2C provides an overview of operations that may be employed to provide in-band provisioning, FIG. 3 illustrates sample call flow where in-band provisioning is provided using a CSG administration function, and FIG. 4 illustrates sample call flow where in-band provisioning is provided using a web server.

Figure 2A:
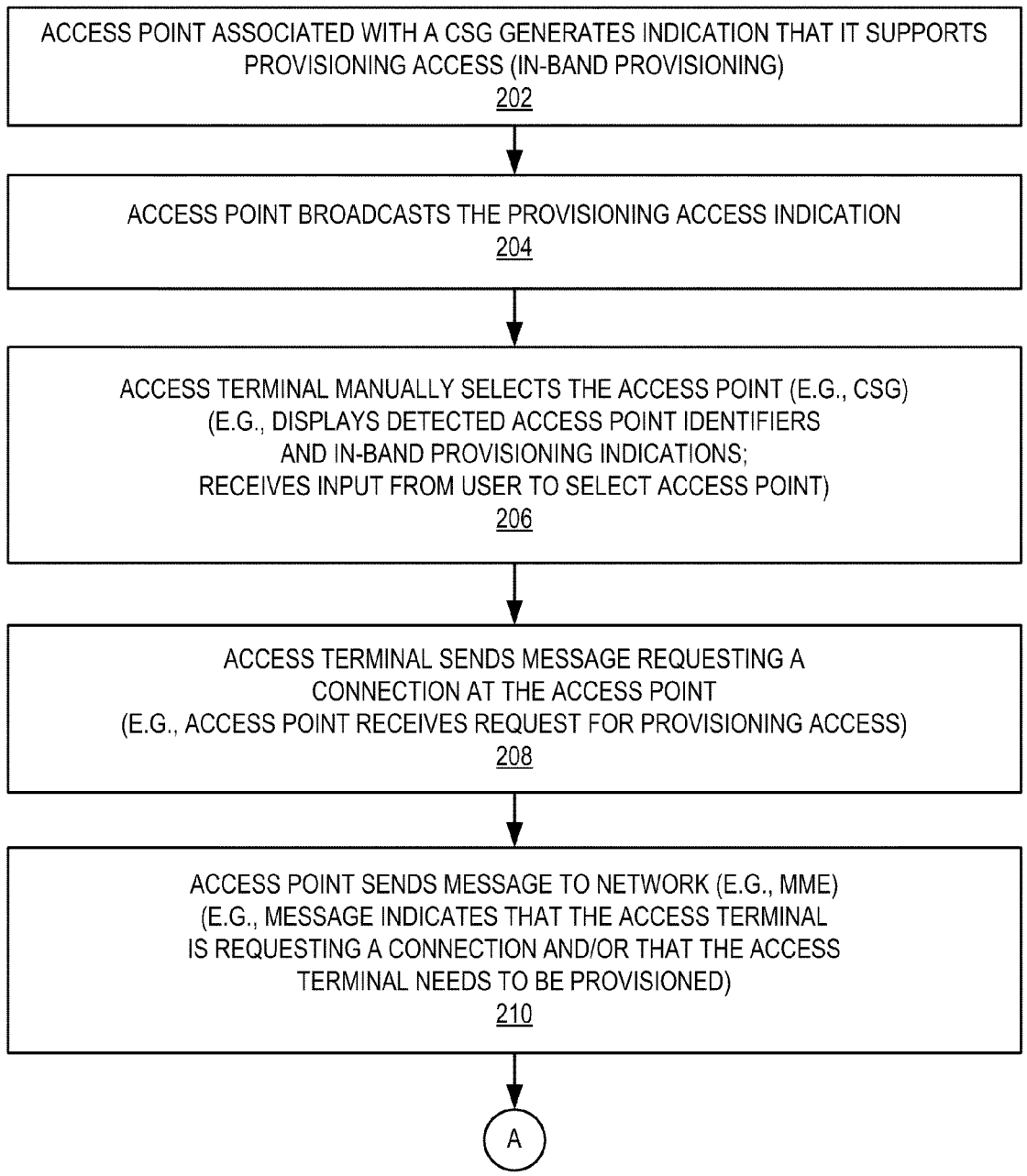
FIGS. 2A-2C are a flowchart of several sample aspects of operations that may be performed to provide in-band provisioning.
Figure 2B:
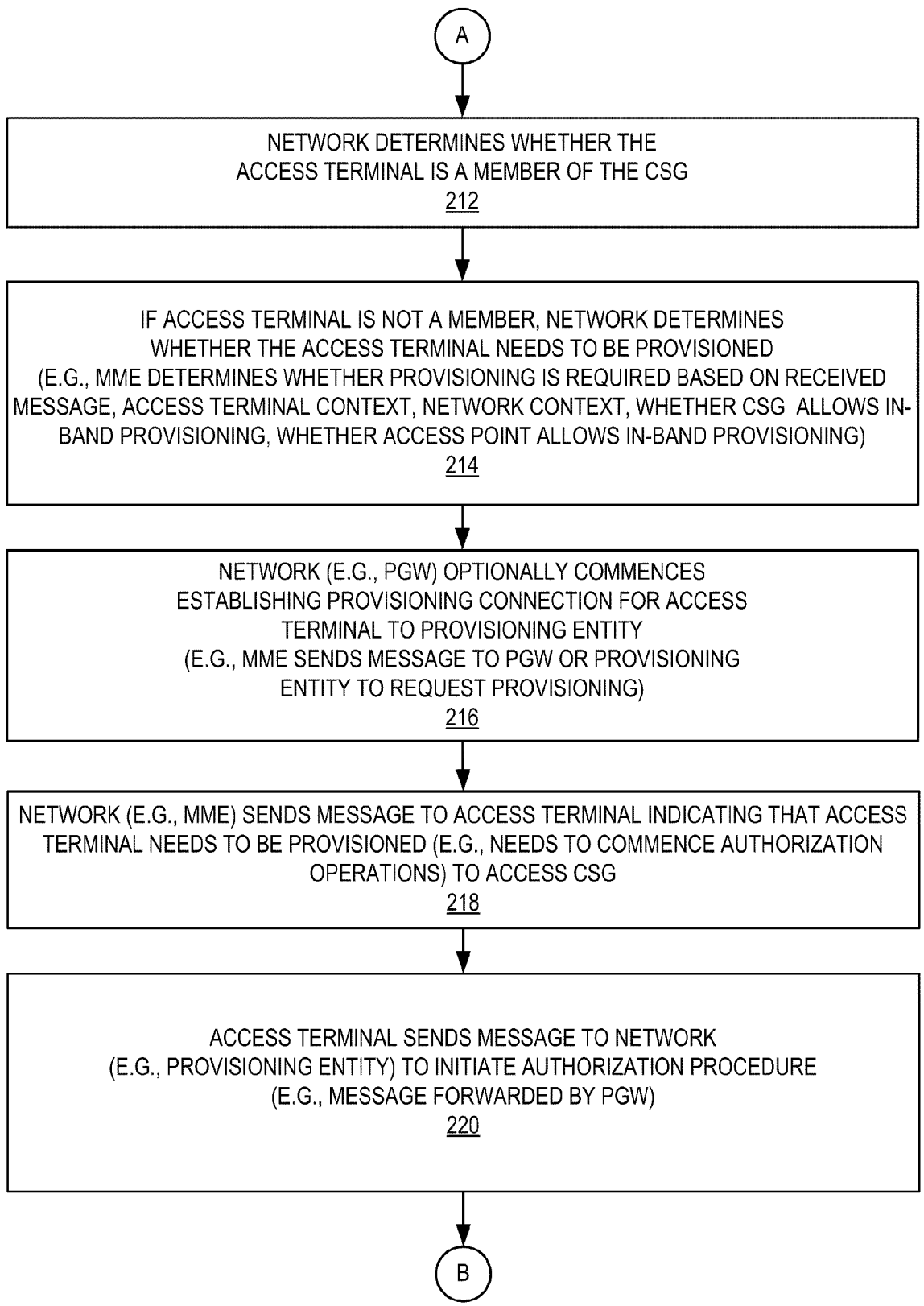
Figure 2C:
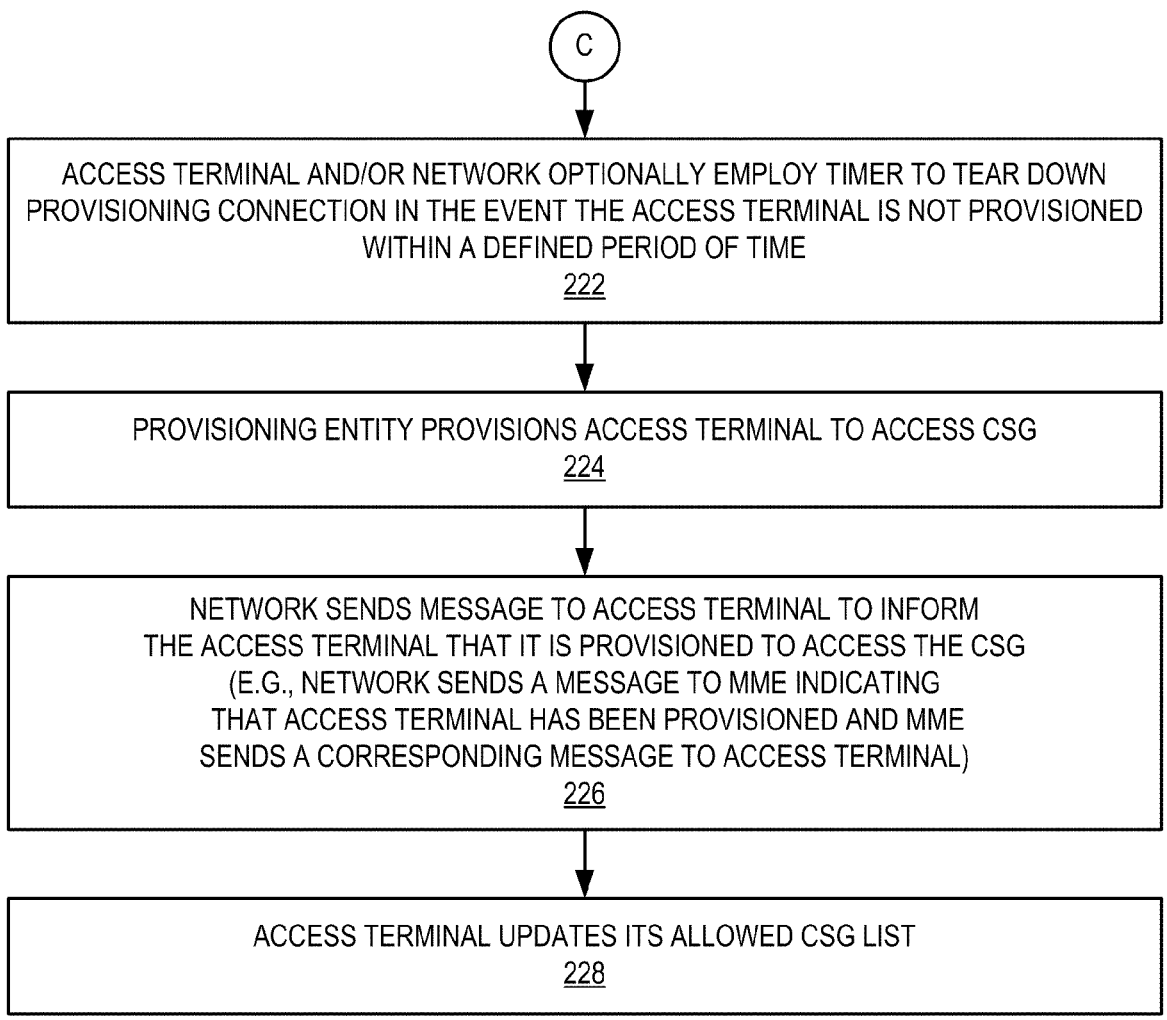
Figure 5:
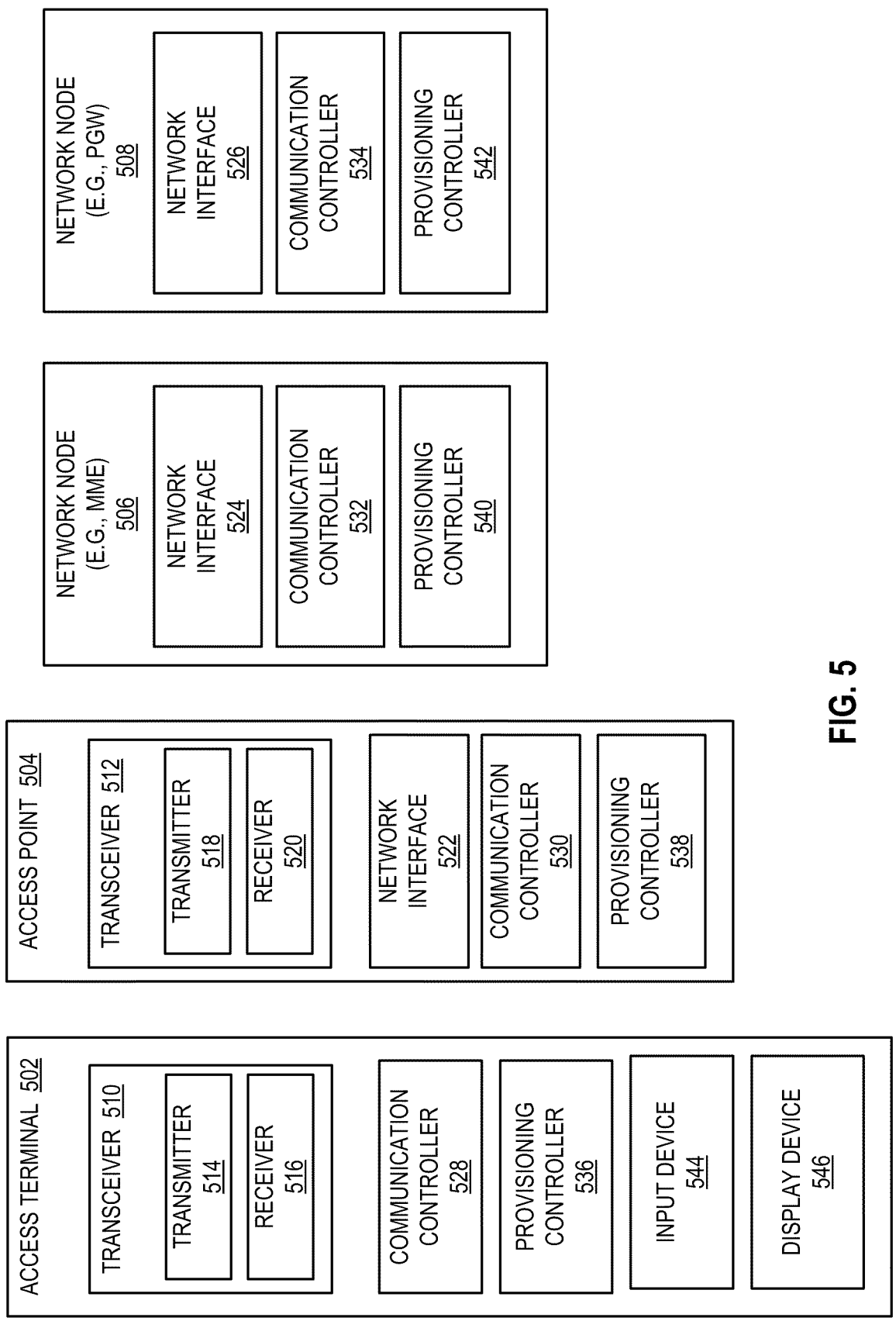
FIG. 5 is a simplified block diagram of several sample aspects of components that may be employed in a communication node.

For illustration purposes, the operations of FIGS. 2A-2C (or any other operations discussed or taught herein) may be described as being performed by specific components (e.g., components shown in FIGS. 1 and 5). It should be appreciated, however, that these operations may be performed by other types of components and may be performed using a different number of components. It also should be appreciated that one or more of the operations described herein may not be employed in a given implementation.

Referring initially to FIG. 2A, blocks 202 and 204 relate to optional operations that an access point associated with a CSG (e.g., a home eNodeB that is a member of a CSG) may perform to advertise that it supports in-band provisioning. Here, the access point may be a closed cell where access to the cell is generally restricted to specific access terminals. As represented by block 202, an access point (e.g., access point 104) generates an indication that it supports provisioning access. For example, the access point may provide a special bit in a system information block (SIB) that is included in messages broadcast by the access point. As represented by block 204, the access point broadcasts this indication over-the-air (e.g., at defined time intervals).

As represented by block 206, at some point in time a user of an access terminal may perform manual selection of an access point (e.g., manually select a cell of an access point). For example, the user may use a user input device of the access terminal to activate a manual selection mode. A user may wish to manually select an access point to, for example, obtain a service uniquely provided by a given CSG. For example, the CSG may be deployed by a third party (e.g., a retailer) to provide free coverage for customers or provide coverage on a fee basis.

Upon activation of the manual selection mode, the access terminal may scan for available access points (e.g., cells advertizing a CSG). For example, the access terminal may monitor for signals from nearby access points and determine whether any of these access points are broadcasting signals that indicate that the access point is associated with a particular CSG.

Upon identifying one or more access points, the access terminal may display a corresponding list on a display device of the access terminal In some aspects, this list may comprise at least one identifier corresponding to each identified access point. For example, for each access point that was detected during the scanning, the list may comprise one or more of: an identifier of the access point, an identifier of an associated CSG, an identifier of a cell of the access point, or an identifier of the wireless network (e.g., public land mobile network, PLMN) of the access point.

In some implementations, the displayed list also may include an indication that the access point (or CSG, etc.) supports in-band provisioning. For example, the access terminal may receive the indication broadcast at block 204 when scanning for available access points. Upon receiving this indication, the access terminal may display a visual indication of this support for in-band provisioning along with the other information in the list.

Other techniques may be employed to inform a user of support for in-band provisioning by an access point. For example, this information may be made available to a user via a receipt (upon the user making a purchase), advertising materials, a webpage, or a sign posted in the vicinity of the access point (e.g., in a retailer's shop). In such cases, the user also may be provided with provisioning authorization information (e.g., user information, a passcode such as a password, etc.) that the user may use as described below to be provisioned for access (e.g., to gain full access) at the access point.

In any of these scenarios, the user may use an input device of the access terminal to select an item from the displayed list. In this way, the access terminal may select an access point (e.g., a CSG) that supports in-band provisioning based on an indication from the user input device.

As represented by block 208, as a result of the manual selection of the access point, the access terminal sends a message to the access point to request a connection at the access point. Such a message may take various forms. For example, the message may comprise a non-access stratum (NAS) message such as a tracking area update (TAU) request or an attach request, or may comprise some other suitable message. Here, a TAU request may be employed, for example, in the event the access terminal was already registered (e.g., via a macro access point) when the access terminal tried to access the access point (e.g., CSG cell). An attach request may be employed, for example, in the event the access terminal was already in an unregistered state.

In some implementations the message sent by the access terminal may explicitly or implicitly indicate that the access terminal is requesting provisioning access at the access point. For example, an indication that provisioning is being requested may comprise a provisioning request indication (e.g., a defined code) that is included in the message, identification of a specific access point name (APN) in the message, a request for a certain type of packet data network (PDN), or a request for a specific packet data network. In the two latter examples, an indication of the PDN type and/or an indication of the PDN name may be included in the message. As a specific example, an access terminal may send an attach request that includes an indication (e.g., a specific APN) that the access terminal is requesting provisioning. As discussed below, in response to this message, the network may establish a provisioning connection.

As represented by block 210, upon receiving the connection request, the access point sends a message to the network. For example, the access point may send a NAS message to a network node such as a mobility management entity (MME). This message may comprise, for example, an indication that the access terminal is requesting a connection at the access point, an indication that the access terminal needs to be provisioned (e.g., as in block 208), or some other information. Such a message also may take various forms. For example, the message may comprise a tracking area update (TAU) request, an attach request, or some other suitable message.

In some implementations, the network may determine whether the access terminal needs to be provisioned. For example, the access terminal may need to be provisioned for access if the access terminal is not currently allowed to access the access and if in-band provisioning is allowed (e.g., supported) by the access point and/or the CSG.

Accordingly, as represented by block 212 of FIG. 2B, the network (e.g., the MME) determines whether the access terminal is a member of the CSG. If it is, access may be allowed.

Alternatively, as represented by block 214, if the access terminal is not a member of the CSG, the network determines whether the access terminal needs to be (e.g., is allowed to be) provisioned. For example, an MME may determine whether provisioning is required based on the message received at block 210, based on access terminal context, based on network context, based on whether the CSG allows in-band provisioning, based on whether the access point allows in-band provisioning, or some combination of these or other factors. As an example of the first factor, an MME may determine that an access terminal needs to be provisioned based on an explicit provisioning request contained in the received message, based on an APN indicated by the received message, based on a PDN type indicated by the received message, or based on a PDN name included in the received message.

As represented by block 216, in some implementations, the network (e.g., a PDN gateway (PGW) or a provisioning entity) may commence establishing a provisioning connection at this point. For example, the MME may send a message to the PGW and/or the provisioning entity, whereby the message indicates that provisioning is needed for the access terminal. In response to this message, the network may establish a provisioning connection from the access terminal to the provisioning entity. FIG. 4, discussed below, describes an example where the establishment of the provisioning connection may commence at this point.

As represented by block 218, the network (e.g., the MME) sends a message to the access terminal that indicates that the access terminal needs to take some action to be provisioned. For example, this message may indicate that the access terminal needs to commence provisioning authorization operations. As discussed below at FIG. 3, this message may comprise, for example, a TAU reject message, a TAU accept message, an attach accept message, or some other suitable message.

Provisioning authorization operations may take various forms. In some cases, the access terminal may be instructed to access a particular webpage (e.g., a webpage served by the provisioning entity) to enable the user to input the appropriate authorization information (e.g., a password). Here, the uniform resource locator (URL) for the webpage may be included in the message sent at block 218. In some cases the network will automatically direct the user to the appropriate webpage or server. It should be appreciated that other authorization procedures may be employed here. Sample authorization procedures are described in more detail below in conjunction with FIGS. 3 and 4.

As represented by block 220, in conjunction with the provisioning authorization operations, the access terminal sends one or more messages to the network to initiate an authorization procedure. In some aspects this message may indicate that the access terminal is authorized to access the access point (e.g., authorized to access the CSG). The access terminal may send this message to the provisioning entity via, for example, the provisioning connection or an application level connection. As described below at FIG. 4, in some implementations a provisioning connection involves the PGW redirecting messages received from the access terminal to a web server that provides the provisioning function.

In some implementations, the network may commence establishing a provisioning connection at this point (e.g., upon receipt of the message from the access terminal). FIG. 3, discussed below, describes an example where the establishment of the provisioning connection may commence at this point.

As represented by block 222 of FIG. 2C, in some implementations the provisioning operations may be terminated in the event the access terminal is not provisioned within a specified time period (e.g., a defined period of time after the provisioning connection is established). For example, a timer may be employed in the network (e.g., the PGW) and/or a timer may be employed in the access terminal, whereby the network and/or the access terminal may tear down (e.g., terminate) the provisioning connection in the event a timer expires before the access terminal is provisioned to access the access point (e.g., CSG).

As represented by block 224, in the event the access terminal provides the proper authorization information to the provisioning entity (or satisfies the provisioning requirement in some other way), the provisioning entity provisions the access terminal to access the access point (e.g., CSG). Here, the access terminal may be provided with greater access (e.g., full access to the access point). For example, in some cases the network may enable the access terminal to access to one or more PDNs via the access point (e.g., provide a connection to a PDN). Also, in some cases the network may provide a higher level of quality of service for the access terminal on a given PDN (e.g., an existing PDN on which the access terminal was previously granted limited access).

As represented by block 226, the network sends a message to the access terminal to inform the access terminal that it has been successfully provisioned to access the access point (e.g., CSG). For example, the provisioning entity or some other network node may send a message to the MME that indicates that the access terminal has been provisioned, whereupon the MME sends a corresponding message to the access terminal.

As represented by block 228, the access terminal may then update its access list (e.g., a whitelist, an allowed CSG list, or some other suitable access list) to add the provisioned access point (e.g., add a CSG ID) to the list. The access terminal may then access the access point according to the new provisioning.

With the above in mind, sample call flows that may be employed in conjunction with in-band provisioning will now be described with reference to FIGS. 3 and 4. FIG. 3 describes sample call flow in an implementation where the in-band provisioning function comprises a CSG administration function (e.g., as performed by a CSG administration server). FIG. 4 describes sample call flow in an implementation where the in-band provisioning function comprises an Internet-type function (e.g., as performed by a web server).

For purposes of illustration, the examples of FIGS. 3 and 4 describe implementations that are based on LTE. Thus, the figures depict components such as user equipment (UE), a home eNodeB (HeNB), an MME, a PGW, and a home subscriber server (HSS). It should be appreciated, however, that the concepts taught herein may be applicable to other implementations (e.g., a UMTS-based system, etc.).

Referring initially to FIG. 3, at step 1, a user manually selects the HeNB (or home NodeB) using a manual CSG selection procedure. As discussed above, the cell may indicate over-the-air that it supports in-band provisioning. At step 2, the UE initiates a connection or other similar procedure (e.g., a TAU procedure, an attach procedure, etc.) by sending a Request message (e.g., TAU Request, Attach Request). At step 3, the eNodeB forwards the Request message to the MME. At step 4, the MME sends a Response message (e.g., TAU Reject, TAU Accept, Attach Accept, etc.) with a newly defined code "Provisioning Required" if the Allowed CSG list for the UE does not include the CSG ID of the H(e)NB where the UE is attempting to access. In some cases, the Response message may include an indication that instructs the UE to not update its access list (e.g., whitelist or Allowed CSG list) at this time. At step 5, in response to the "Provisioning Required" code in the Response message, the UE shall prompt the user to run the in-band provisioning application procedures.

The in-band provisioning function may take various forms. For example, the Response message may include a URL for the UE to select that goes to the CSG Admin Function (e.g., a CSG administration server), and users may use similar procedures as CSG owners to provision themselves. An application such as a web browser may provide flexibility to implement many different business models since the web page may request any type of information from the user such as passwords, billing information (e.g., credit card information), and so on.

At step 6, the in-band provisioning authorization procedures are performed. For example, in an implementation where an application layer solution (e.g., a user plane function) is defined to perform the in-band provisioning, the MME may allow the UE to setup the necessary bearers (e.g., default bearers) and the user enters in any necessary information to add the UE to the CSG. Alternatively, lower layer functionality (e.g., a control plane function such as NAS signaling) may be employed to send authorization messages between the UE and the CSG Administration Function in some implementations.

Bearers may be set up at a different point in the procedure in different implementations. For example, if the Request in step 3 is an Attach Request, bearers (e.g., default bearers) may be set up in conjunction with sending an Attach Accept at step 4. Thus, in some aspects, step 4 and/or step 6 may relate to establishing a provisioning connection as discussed herein.

In addition, various techniques may be employed to direct the UE to the CSG Administration Function. For example, in some implementations, step 6 may involve a redirection function whereby a message from the UE is sent to a designated destination (e.g., the URL of the CSG Administration Function) irrespective of whether the message includes a URL or irrespective of any particular URL that may be included in the message.

At step 7, once the user is approved, the CSG Administration Function communicates with the HSS to update the user's Allowed CSG list (e.g., to include an identifier of the CSG for the HeNB). At step 8, the HSS confirms that the user's subscription information has been correctly updated. At step 9, the HSS sends an Insert Subscriber Data (IMSI, Subscription Data) message to the MME. At step 10, if all checks are successful, the MME constructs a context for the UE and returns an Insert Subscriber Data Ack message to the HSS. At step 11, the MME sends an Accept message (e.g., TAU Accept, Attach Accept) to confirm that the UE has been successfully provisioned on the CSG. In addition, all other bearers for the UE are setup, if applicable (e.g., full connectivity is provided to the UE). The UE then adds the CSG ID of the CSG cell to the Allowed CSG list in response to the Accept message and proceeds to access the added services that are now available to it through the HeNB.

A potential advantage of the above method is that the UE may alert the user when the CSG cell is accessed as to what is further needed to complete the in-band provisioning process. Thus, the user does not need to know in advance whether he or she needs to open a browser and select a URL. Another potential advantage is that the user already has a billing relationship with the home PLMN which may be used to simplify the process (e.g., through the use of one-click billing). A further potential advantage is that a provisioning application may be implemented on access terminals (e.g., handsets) that do not have web browsing capability.

Referring now to FIG. 4, at step 1, a user manually selects the HeNB (or home NodeB) and performs other preliminary operations. For example, the operations represented by step 1 in FIG. 4 may correspond to some or all of the operations of steps 1-5 in FIG. 3.

At step 2 in FIG. 4, the UE is allowed to setup a connection including being admitted by the MME and establishing a default bearer to a default PGW. However, no data traffic is allowed to be sent by the UE via the PGW. At step 3, the user selects a link in the web browser which sends a HTTP request message, for example, the GET method to an arbitrary web page identified by the Request-URL. At step 4, the HTTP GET is redirected to a web-server behind the PGW which is hosting the in-band provisioning at the CSG. Thus, in some aspects, steps 2-4 relate to establishing a provisioning connection as discussed herein.

At step 5, the web server hosting the in-band provisioning returns an HTTP response, e.g. an HTTP PAGE method which includes a prompt for the user to enter password information, a confirmation, billing information, etc (step 6). For example, when making a purchase at a coffee shop, a password may be printed on the receipt which allows the user free access for up to one hour. The response may include a request to enter billing information, or the billing may be performed by charging the user's subscription via the user's home PLMN.

At step 7, the response to the PAGE is forwarded to the web server, for example via a HTTP POST method including any information the user entered. At step 8, the web server validates the contents of the response and, for example, initiates any billing based on the response. At step 9, the web server enables other data traffic to be sent through the PGW for that user's subscription.

FIG. 5 illustrates several sample components that may be incorporated into nodes such as an access terminal 502, an access point 504, a network node 506 (e.g., an MME), and a network node 508 (e.g., a PGW) to perform provisioning operations as taught herein. In general, the nodes of FIG. 5 may correspond to the access terminal 102, the access point 104, and the network node 106 of FIG. 1. The described components also may be incorporated into other nodes in a communication system. For example, other nodes in a system may include components similar to those described for the nodes 502, 504, 506, and 508 to provide similar functionality. A given node may contain one or more of the described components. For example, an access terminal may contain multiple transceiver components that enable the access terminal to operate on multiple frequencies and/or communicate via different technologies.

As shown in FIG. 5, the access terminal 502 and the access point 504 may include transceivers 510 and 512, respectively, for communicating with other nodes. The transceiver 510 includes a transmitter 514 for sending signals (e.g., messages or indications) and a receiver 516 for receiving signals. Similarly, the transceiver 512 includes a transmitter 518 for sending signals and a receiver 520 for receiving signals.

The access point 504, the network node 506, and the network node 508 also include network interfaces 522, 524, and 526, respectively, for communicating with one another or other network nodes. For example, the network interfaces 522, 524, and 526 may be configured to communicate with one or more network nodes via a wired or wireless backhaul.

The nodes 502, 504, 506, and 508 also include other components that may be used in conjunction with provisioning operations as taught herein. For example, the nodes 502, 504, 506, and 508 include communication controllers 528, 530, 532, and 534, respectively, for managing communication with other nodes (e.g., one or more of sending and receiving messages, requests, indications, authorization information, or responses) and for providing other related functionality as taught herein. In addition, the nodes 502, 504, 506, and 508 include provisioning controllers 536, 538, 540, and 542, respectively, for supporting in-band provisioning and for providing other related functionality (e.g., one or more of determining whether an access terminal needs to be provisioned, establishing and terminating a provisioning connection, provisioning an access terminal, determining whether an access terminal is a member of a CSG, sending and receiving provisioning messages, forwarding provisioning authorization information, updating CSG lists, or generating provisioning indications) as taught herein. These provisioning controllers correspond to the provisioning components described in FIG. 1. Finally, the access terminal 502 includes an input device 544 and a display device 546 as discussed herein.

For convenience the nodes are shown in FIG. 5 as including components that may be used in the various examples described herein. In practice, one or more of the illustrated components may be implemented in different ways in different implementations. As an example, the nodes may have different functionality and/or operate in a different manner (e.g., provisioning an access terminal in a different manner) in the implementation of FIG. 3 as compared to the implementation of FIG. 4. Also, in some implementations the illustrated network nodes 506 and 508 may be implemented in a single entity. In such a case, a single component (e.g., network interface) may provide the functionality of multiple illustrated components.

In some implementations the components of FIG. 5 may be implemented in one or more processors (e.g., that uses and/or incorporates data memory). For example, the functionality of blocks 528 and 536 may be implemented by a processor or processors of an access terminal, the functionality of blocks 530 and 538 may be implemented by a processor or processors of an access point, the functionality of blocks 532 and 540 may be implemented by a processor or processors in a network node, and the functionality of blocks 534 and 542 may be implemented by a processor or processors in a network node.

The teachings herein may be employed in an environment that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such an environment, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro access point while a node that provides coverage over a relatively small area (e.g., a residence) may be referred to as a femto access point (e.g., a HNB or HeNB). It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., divided into) one or more cells or sectors. A cell or sector associated with a macro access point, a femto access point, or a pico access point may be referred to as a macro cell, a femto cell, or a pico cell, respectively.

Figure 6:
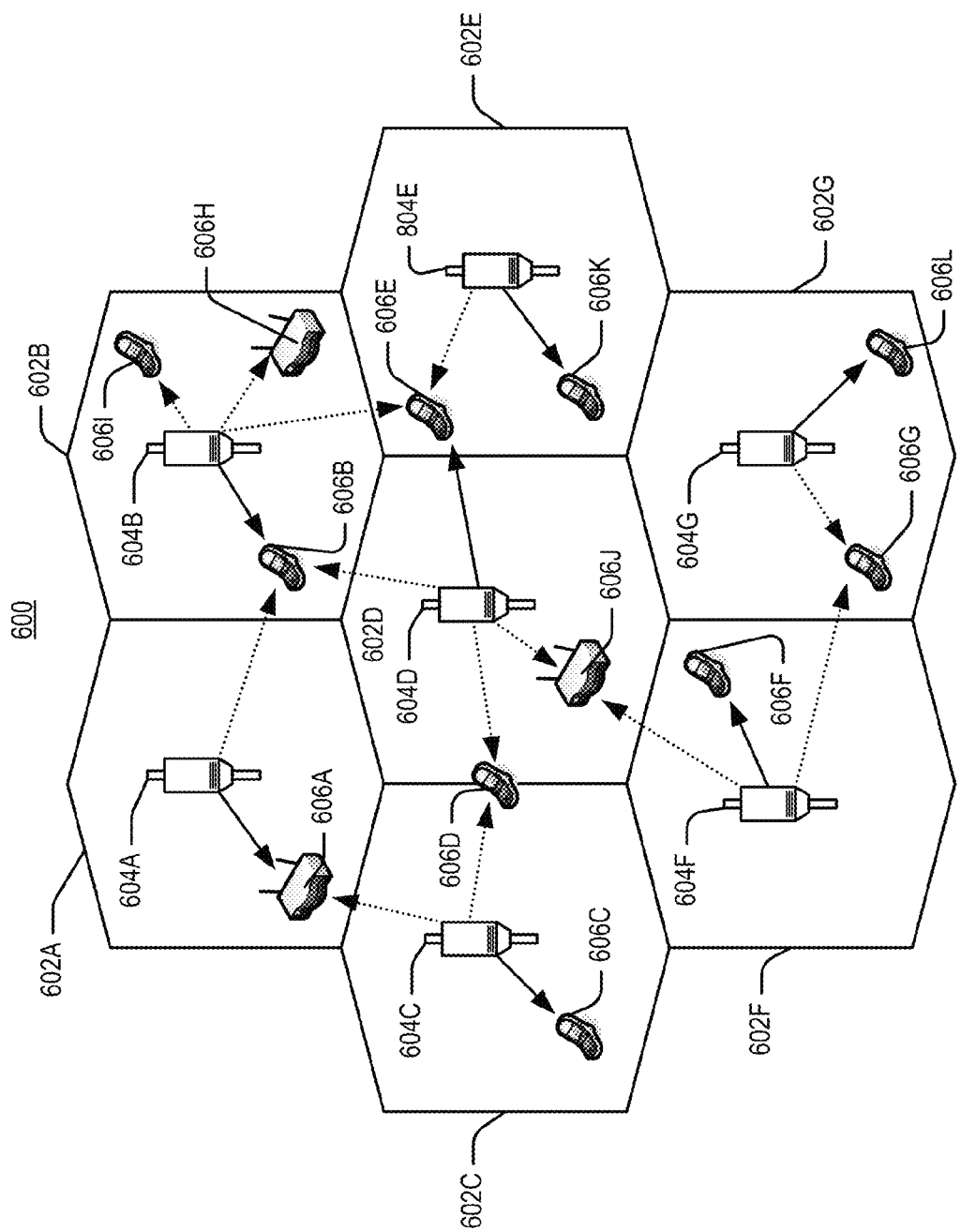
FIG. 6 is a simplified diagram of a wireless communication system.

FIG. 6 illustrates a wireless communication system 600, configured to support a number of users, in which the teachings herein may be implemented. The system 600 provides communication for multiple cells 602, such as, for example, macro cells 602A-602G, with each cell being serviced by a corresponding access point 604 (e.g., access points 604A-604G). As shown in FIG. 6, access terminals 606 (e.g., access terminals 606A-606L) may be dispersed at various locations throughout the system over time. Each access terminal 606 may communicate with one or more access points 604 on a forward link (FL) and/or a reverse link (RL) at a given moment, depending upon whether the access terminal 606 is active and whether it is in soft handoff, for example. The wireless communication system 600 may provide service over a large geographic region. For example, macro cells 602A-602G may cover a few blocks in a neighborhood or several miles in rural environment.

Figure 7:
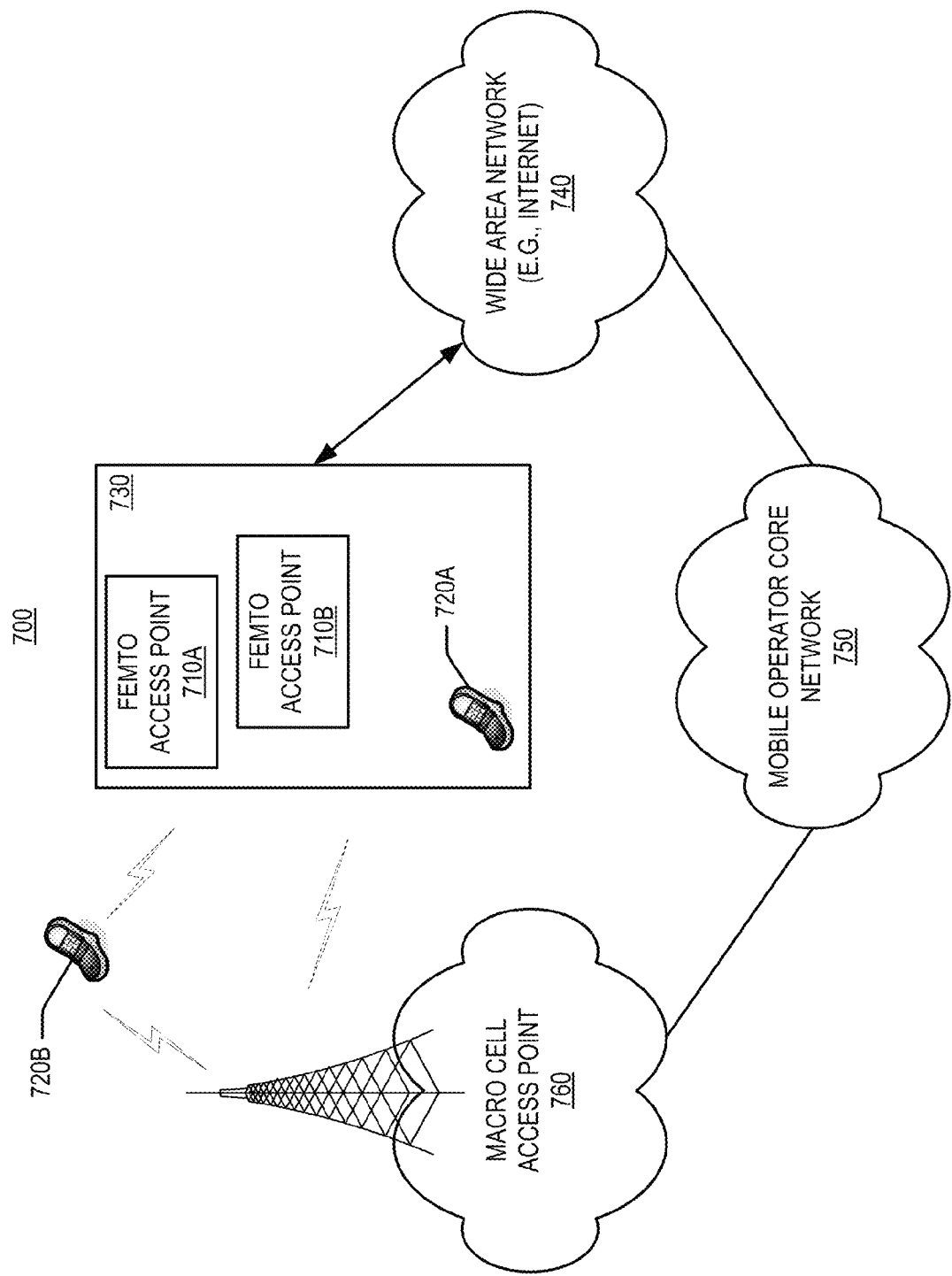
FIG. 7 is a simplified diagram of a wireless communication system including femto nodes.

FIG. 7 illustrates an exemplary communication system 700 where one or more femto access points are deployed within a network environment. Specifically, the system 700 includes multiple femto access points 710 (e.g., femto access points 710A and 710B) installed in a relatively small scale network environment (e.g., in one or more user residences 730). Each femto access point 710 may be coupled to a wide area network 740 (e.g., the Internet) and a mobile operator core network 750 via a DSL router, a cable modem, a wireless link, or other connectivity means (not shown). As will be discussed below, each femto access point 710 may be configured to serve associated access terminals 720 (e.g., access terminal 720A) and, optionally, other (e.g., hybrid or alien) access terminals 720 (e.g., access terminal 720B). In other words, access to femto access points 710 may be restricted whereby a given access terminal 720 may be served by a set of designated (e.g., home) femto access point(s) 710 but may not be served by any non-designated femto access points 710 (e.g., a neighbor's femto access point 710).

Figure 8:
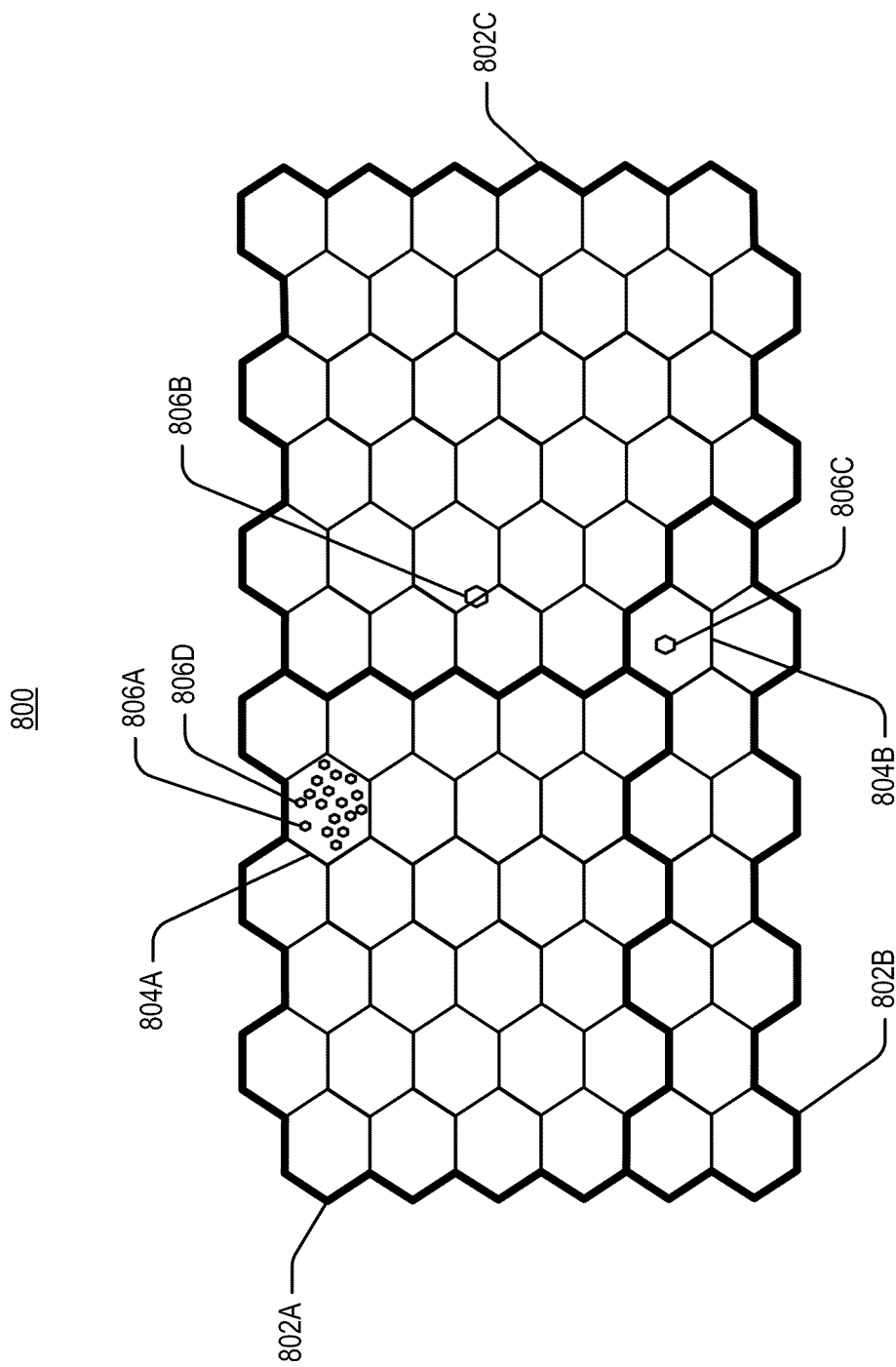
FIG. 8 is a simplified diagram illustrating coverage areas for wireless communication.

FIG. 8 illustrates an example of a coverage map 800 where several tracking areas 802 (or routing areas or location areas) are defined, each of which includes several macro coverage areas 804. Here, areas of coverage associated with tracking areas 802A, 802B, and 802C are delineated by the wide lines and the macro coverage areas 804 are represented by the larger hexagons. The tracking areas 802 also include femto coverage areas 806. In this example, each of the femto coverage areas 806 (e.g., femto coverage areas 806B and 806C) is depicted within one or more macro coverage areas 804 (e.g., macro coverage areas 804A and 804B). It should be appreciated, however, that some or all of a femto coverage area 806 may not lie within a macro coverage area 804. In practice, a large number of femto coverage areas 806 (e.g., femto coverage areas 806A and 806D) may be defined within a given tracking area 802 or macro coverage area 804. Also, one or more pico coverage areas (not shown) may be defined within a given tracking area 802 or macro coverage area 804.

Referring again to FIG. 7, the owner of a femto access point 710 may subscribe to mobile service, such as, for example, 3G mobile service, offered through the mobile operator core network 750. In addition, an access terminal 720 may be capable of operating both in macro environments and in smaller scale (e.g., residential) network environments. In other words, depending on the current location of the access terminal 720, the access terminal 720 may be served by a macro cell access point 760 associated with the mobile operator core network 750 or by any one of a set of femto access points 710 (e.g., the femto access points 710A and 710B that reside within a corresponding user residence 730). For example, when a subscriber is outside his home, he is served by a standard macro access point (e.g., access point 760) and when the subscriber is at home, he is served by a femto access point (e.g., access point 710A). Here, a femto access point 710 may be backward compatible with legacy access terminals 720.

A femto access point 710 may be deployed on a single frequency or, in the alternative, on multiple frequencies. Depending on the particular configuration, the single frequency or one or more of the multiple frequencies may overlap with one or more frequencies used by a macro access point (e.g., access point 760).

In some aspects, an access terminal 720 may be configured to connect to a preferred femto access point (e.g., the home femto access point of the access terminal 720) whenever such connectivity is possible. For example, whenever the access terminal 720A is within the user's residence 730, it may be desired that the access terminal 720A communicate only with the home femto access point 710A or 710B.

In some aspects, if the access terminal 720 operates within the macro cellular network 750 but is not residing on its most preferred network (e.g., as defined in a preferred roaming list), the access terminal 720 may continue to search for the most preferred network (e.g., the preferred femto access point 710) using a better system reselection (BSR), which may involve a periodic scanning of available systems to determine whether better systems are currently available, and subsequent efforts to associate with such preferred systems. With the acquisition entry, the access terminal 720 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 710, the access terminal 720 selects the femto access point 710 for camping within its coverage area.

A femto access point may be restricted in some aspects. For example, a given femto access point may only provide certain services to certain access terminals. In deployments with so-called restricted (or closed) association, a given access terminal may only be served by the macro cell mobile network and a defined set of femto access points (e.g., the femto access points 710 that reside within the corresponding user residence 730). In some implementations, a node may be restricted to not provide, for at least one node, at least one of: signaling, data access, registration, paging, or service.

In some aspects, a restricted femto access point (which may also be referred to as a closed subscriber group Home NodeB) is one that provides service to a restricted provisioned set of access terminals. This set may be temporarily or permanently extended as necessary. In some aspects, a closed subscriber group identifies subscribers of an operator who are permitted to access one or more cells of a wireless network (e.g., PLMN) but which have restricted access. In some aspects, a closed subscriber group may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with no restricted association (e.g., the femto access point allows access to any access terminal). A restricted femto access point may refer to a femto access point that is restricted in some manner (e.g., restricted for association and/or registration). A home femto access point may refer to a femto access point on which the access terminal is authorized to access and operate on (e.g., permanent access is provided for a defined set of one or more access terminals). A hybrid (or guest) femto access point may refer to a femto access point on which an access terminal is temporarily authorized to access or operate on. An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point (e.g., the access terminal has permanent access to the femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 9:
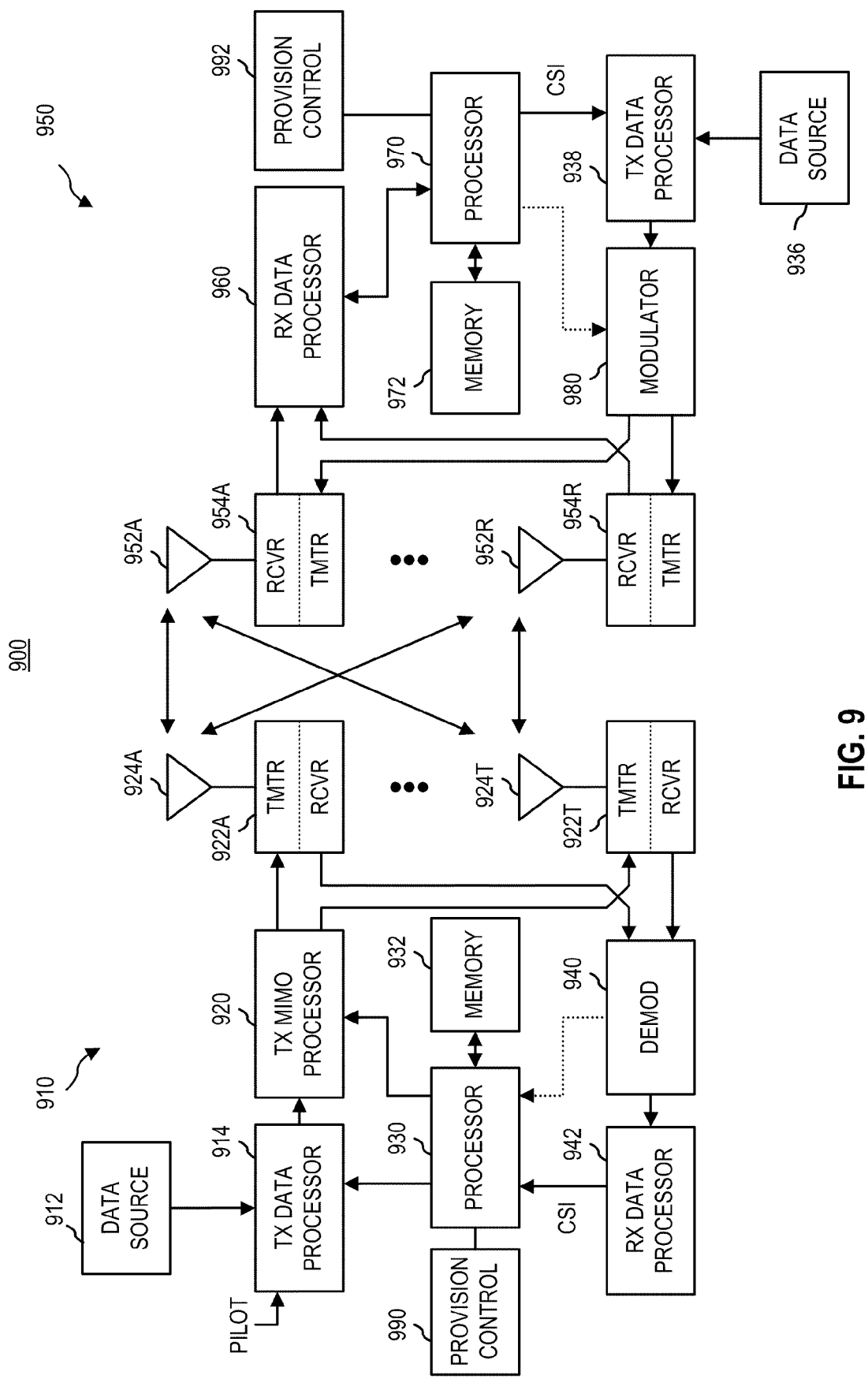
FIG. 9 is a simplified block diagram of several sample aspects of communication components.
Figure 10:
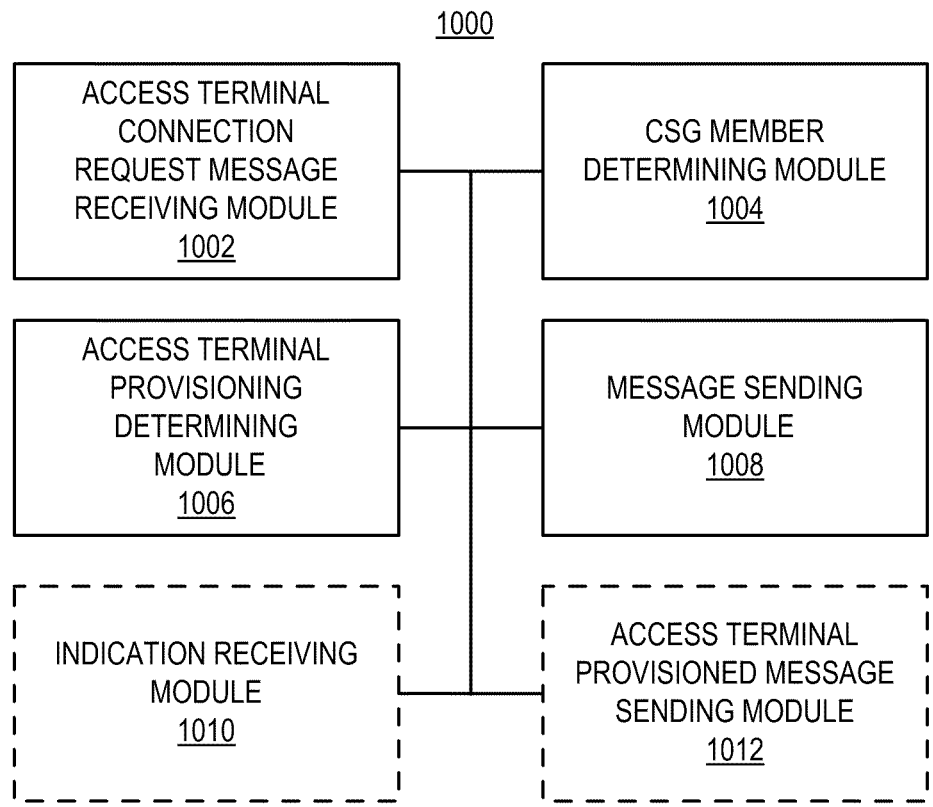
FIGS. 10-13 are simplified block diagrams of several sample aspects of apparatuses configured to provide in-band provisioning as taught herein.
Figure 11:
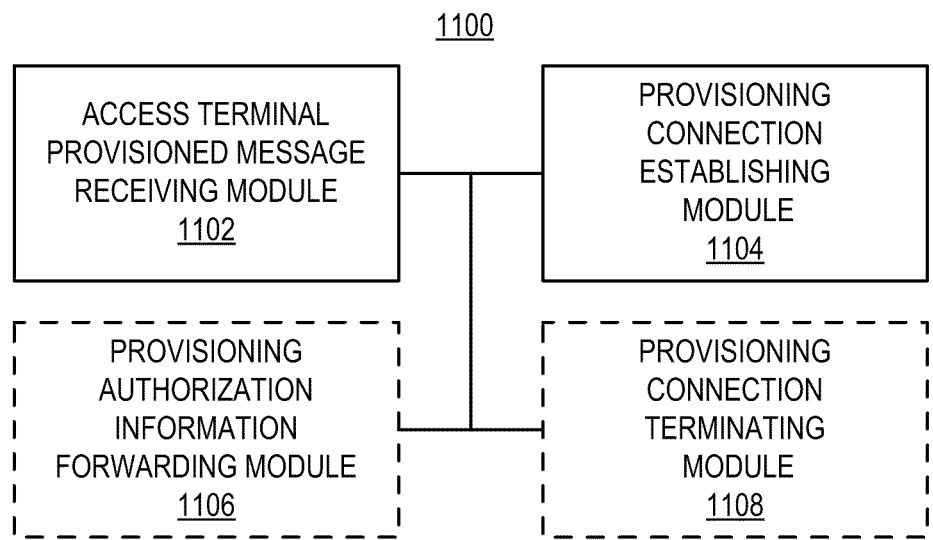
Figure 12:
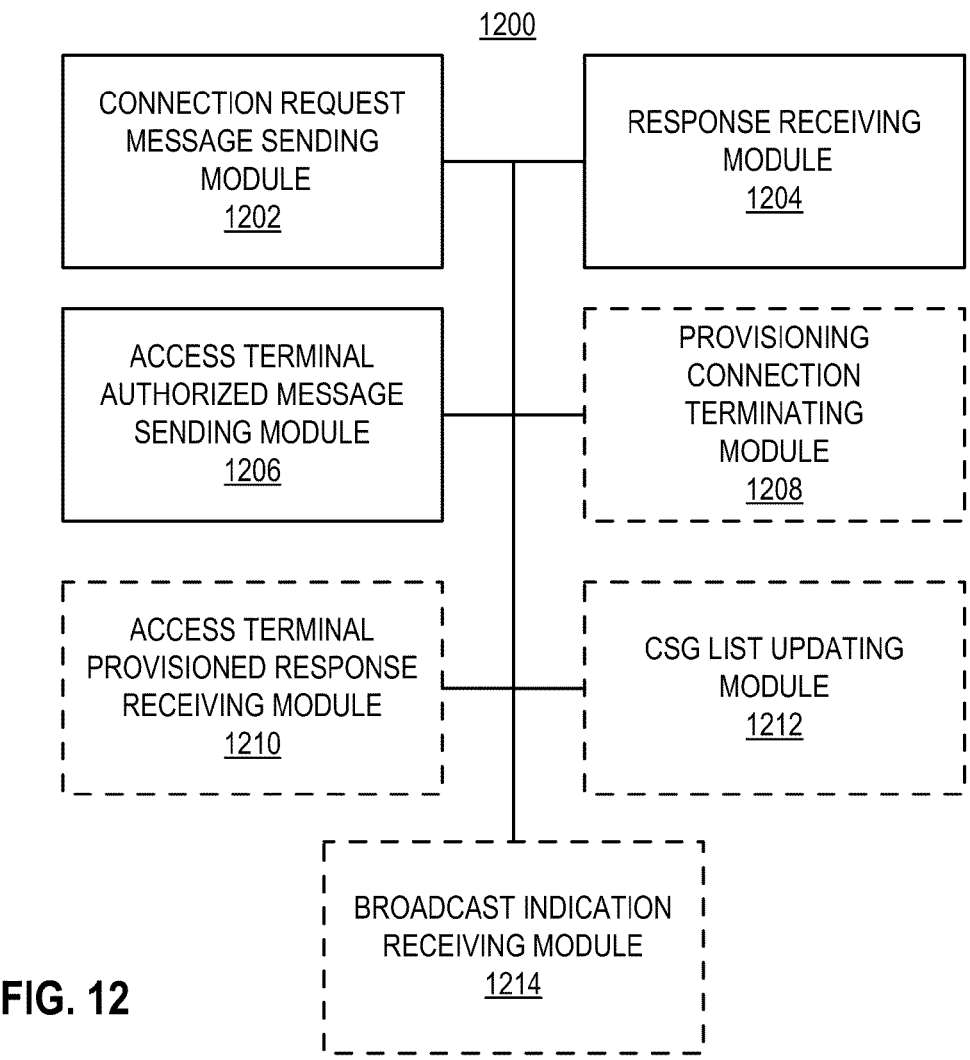
Figure 13:
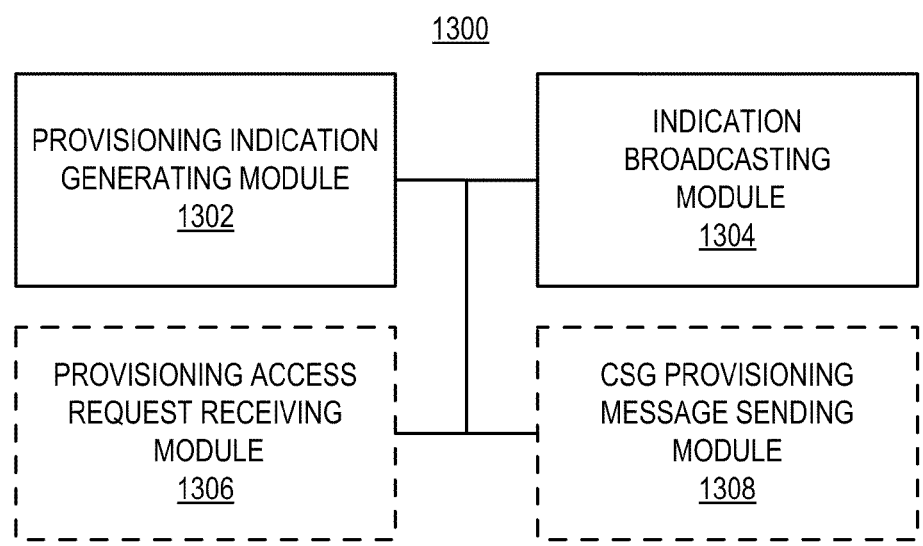

FIG. 9 illustrates a wireless device 910 (e.g., an access point) and a wireless device 950 (e.g., an access terminal) of a sample MIMO system 900. At the device 910, traffic data for a number of data streams is provided from a data source 912 to a transmit (TX) data processor 914. Each data stream may then be transmitted over a respective transmit antenna.

The TX data processor 914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides $N_T$ modulation symbol streams to $N_T$ transceivers (XCVR) 922A through 922T. In some aspects, the TX MIMO processor 920 applies beam-forming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922A through 922T are then transmitted from $N_T$ antennas 924A through 924T, respectively.

At the device 950, the transmitted modulated signals are received by $N_R$ antennas 952A through 952R and the received signal from each antenna 952 is provided to a respective transceiver (XCVR) 954A through 954R. Each transceiver 954 conditions (e.g., filters, amplifies, and downconverts) a respective received signal, digitizes the conditioned signal to provide samples, and further processes the samples to provide a corresponding "received" symbol stream.

A receive (RX) data processor 960 then receives and processes the $N_R$ received symbol streams from $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator (DEMOD) 940, and processed by a RX data processor 942 to extract the reverse link message transmitted by the device 950. The processor 930 then determines which pre-coding matrix to use for determining the beam-forming weights then processes the extracted message.

FIG. 9 also illustrates that the communication components may include one or more components that perform provisioning control operations as taught herein. For example, a provision control component 990 may cooperate with the processor 930 and/or other components of the device 910 to provide in-band provisioning as taught herein. Similarly, a provision control component 992 may cooperate with the processor 970 and/or other components of the device 950 to provide in-band provisioning. It should be appreciated that for each device 910 and 950 the functionality of two or more of the described components may be provided by a single component. For example, a single processing component may provide the functionality of the provision control component 990 and the processor 930 and a single processing component may provide the functionality of the provision control component 992 and the processor 970.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 10, 11, 12, and 13, apparatuses 1000, 1100, 1200, and 1200 are represented as a series of interrelated functional modules. Here, an access terminal connection request message receiving module 1002 may correspond at least in some aspects to, for example, a communication controller as discussed herein. A CSG member determining module 1004 may correspond at least in some aspects to, for example, a provisioning controller as discussed herein. An access terminal provisioning determining module 1006 may correspond at least in some aspects to, for example, a provisioning controller as discussed herein. A message sending module 1008 may correspond at least in some aspects to, for example, a communication controller as discussed herein. An indication receiving module 1010 may correspond at least in some aspects to, for example, a communication controller as discussed herein. An access terminal provisioned message sending module 1012 may correspond at least in some aspects to, for example, a provisioning controller as discussed herein. An access terminal provisioned message receiving module 1102 may correspond at least in some aspects to, for example, a communication controller as discussed herein. A provisioning connection establishing module 1104 may correspond at least in some aspects to, for example, a provisioning controller as discussed herein. A provisioning authorization information forwarding module 1106 may correspond at least in some aspects to, for example, a provisioning controller as discussed herein. A provisioning connection terminating module 1108 may correspond at least in some aspects to, for example, a provisioning controller as discussed herein. A connection request message sending module 1202 may correspond at least in some aspects to, for example, a communication controller as discussed herein. A response receiving module 1204 may correspond at least in some aspects to, for example, a communication controller as discussed herein. An access terminal authorized message sending module 1206 may correspond at least in some aspects to, for example, a provisioning controller as discussed herein. A provisioning connection terminating module 1208 may correspond at least in some aspects to, for example, a provisioning controller as discussed herein. An access terminal provisioned response receiving module 1210 may correspond at least in some aspects to, for example, a communication controller as discussed herein. A CSG list updating module 1212 may correspond at least in some aspects to, for example, a provisioning controller as discussed herein. A broadcast indication receiving module 1214 may correspond at least in some aspects to, for example, a communication controller as discussed herein. A provisioning indication generating module 1302 may correspond at least in some aspects to, for example, a provisioning controller as discussed herein. An indication broadcasting module 1304 may correspond at least in some aspects to, for example, a transmitter as discussed herein. A provisioning access request receiving module 1306 may correspond at least in some aspects to, for example, a communication controller as discussed herein. A CSG provisioning message sending module 1308 may correspond at least in some aspects to, for example, a provisioning controller as discussed herein.

The functionality of the modules of FIGS. 10-13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 10-13 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
sending an indication that an access point of a closed subscriber group supports in-band provisioning;
receiving a first message that indicates that an access terminal is requesting a connection to the access point of the closed subscriber group, wherein the first message comprises a tracking area update request message;
determining that the access terminal is not a member of the closed subscriber group;
determining, as a result of the determination that the access terminal is not a member of the closed subscriber group, whether the access terminal needs to be provisioned to access the closed subscriber group; and
sending a second message to the access terminal, wherein the second message comprises a tracking area update accept message or a tracking area update reject message, wherein the second message indicates that the access terminal needs to be provisioned to access the closed subscriber group, wherein a default bearer is set up for provisioning the access terminal in conjunction with the sending of the second message, and wherein the default bearer is terminated if the access terminal is not provisioned within a defined period of time.

2. The method of claim 1, wherein the second message comprises a uniform resource locator to be used for provisioning the access terminal.

3. The method of claim 1, wherein:
the first message comprises an attach request; and
the second message comprises an attach accept.

4. The method of claim 1, wherein the second message is sent to a network node and comprises a request to provision the access terminal to access the closed subscriber group.

5. The method of claim 4, wherein the network node comprises a packet gateway or a provisioning entity.

6. The method of claim 1, wherein the determination of whether the access terminal needs to be provisioned is based on an indication received via the first message.

7. The method of claim 6, wherein the received indication comprises a packet data network type, a packet data network name, or an access point name.

8. The method of claim 1, wherein the determination of whether the access terminal needs to be provisioned is based on an access terminal profile or a network profile.

9. The method of claim 1, wherein the determination of whether the access terminal needs to be provisioned is based on whether the closed subscriber group allows in-band provisioning.

10. The method of claim 1, wherein the determination of whether the access terminal needs to be provisioned is based on whether the access point allows in-band provisioning.

11. The method of claim 1, further comprising:
receiving an indication that the access terminal has been provisioned to access the closed subscriber group; and
sending a third message to the access terminal as a result of the receipt of the indication, wherein the third message indicates that the access terminal has been provisioned to access the closed subscriber group.

12. The method of claim 1, wherein the provisioning of the access terminal involves providing a connection to a packet data network or providing a higher level of quality of service for the access terminal on an existing packet data network connection.

13. The method of claim 1, wherein the access point comprises a home eNodeB.

14. An apparatus for communication, comprising:
a communication controller configured to send an indication that an access point of a closed subscriber group supports in-band provisioning and to receive a first message that indicates that an access terminal is requesting a connection to the access point of the closed subscriber group, wherein the first message comprises a tracking area update request message; and
a provisioning controller configured to determine that the access terminal is not a member of the closed subscriber group, and further configured to determine, as a result of the determination that the access terminal is not a member of the closed subscriber group, whether the access terminal needs to be provisioned to access the closed subscriber group,
wherein the communication controller is configured to send a second message to the access terminal, wherein the second message comprises a tracking area update accept message or a tracking area update reject message, wherein the second message indicates that the access terminal needs to be provisioned to access the closed subscriber group, wherein a default bearer is set up for provisioning the access terminal in conjunction with the sending of the second message, and wherein the default bearer is terminated if the access terminal is not provisioned within a defined period of time.

15. The apparatus of claim 14, wherein the second message comprises a uniform resource locator to be used for provisioning the access terminal.

16. The apparatus of claim 14, wherein the second message is sent to a network node and comprises a request to provision the access terminal to access the closed subscriber group.

17. The apparatus of claim 14, wherein:
the determination of whether the access terminal needs to be provisioned is based on an indication received via the first message; and
the received indication comprises a packet data network type, a packet data network name, or an access point name.

18. An apparatus for communication, comprising:
means for sending an indication that an access point of a closed subscriber group supports in-band provisioning;
means for receiving a first message that indicates that an access terminal is requesting a connection to the access point of the closed subscriber group, wherein the first message comprises a tracking area update request message;
means for determining that the access terminal is not a member of the closed subscriber group;
means for determining, as a result of the determination that the access terminal is not a member of the closed subscriber group, whether the access terminal needs to be provisioned to access the closed subscriber group; and
means for sending a second message to the access terminal, wherein the second message comprises a tracking area update accept message or a tracking area update reject message, wherein the second message indicates that the access terminal needs to be provisioned to access the closed subscriber group, wherein a default bearer is set up for provisioning the access terminal in conjunction with the sending of the second message, and wherein the default bearer is terminated if the access terminal is not provisioned within a defined period of time.

19. The apparatus of claim 18, wherein the second message comprises a uniform resource locator to be used for provisioning the access terminal.

20. The apparatus of claim 18, wherein the second message is sent to a network node and comprises a request to provision the access terminal to access the closed subscriber group.

21. The apparatus of claim 18, wherein:
the determination of whether the access terminal needs to be provisioned is based on an indication received via the first message; and
the received indication comprises a packet data network type, a packet data network name, or an access point name.

22. A computer-program product, comprising:
a non-transitory computer-readable medium comprising code for causing a computer to:
send an indication that an access point of a closed subscriber group supports in-band provisioning;
receive a first message that indicates that an access terminal is requesting a connection to the access point of the closed subscriber group, wherein the first message comprises a tracking area update request message;
determine that the access terminal is not a member of the closed subscriber group;
determine, as a result of the determination that the access terminal is not a member of the closed subscriber group, whether the access terminal needs to be provisioned to access the closed subscriber group; and
send a second message to the access terminal, wherein the second message comprises a tracking area update accept message or a tracking area update reject message, wherein the second message indicates that the access terminal needs to be provisioned to access the closed subscriber group, wherein a default bearer is set up for provisioning the access terminal in conjunction with the sending of the second message, and wherein the default bearer is terminated if the access terminal is not provisioned within a defined period of time.

23. The computer-program product of claim 22, wherein the second message comprises a uniform resource locator to be used for provisioning the access terminal.

24. The computer-program product of claim 22, wherein the second message is sent to a network node and comprises a request to provision the access terminal to access the closed subscriber group.

25. The computer-program product of claim 22, wherein:
the determination of whether the access terminal needs to be provisioned is based on an indication received via the first message; and
the received indication comprises a packet data network type, a packet data network name, or an access point name.

* * * * *